US011243120B2

(12) United States Patent
Cho et al.

(10) Patent No.: US 11,243,120 B2
(45) Date of Patent: *Feb. 8, 2022

(54) TEMPERATURE SENSOR EMBEDDED IN PROCESSOR, METHOD OF OPERATING THE SAME, AND DEVICES INCLUDING THE SAME

(71) Applicant: SAMSUNG ELECTRONICS CO., LTD., Suwon-si (KR)

(72) Inventors: Sang Hyun Cho, Asan-si (KR); Hyung Jong Ko, Seongnam-si (KR); Kyung Soo Park, Seoul (KR); Seoung Jae Yoo, Seongnam-si (KR); Sang Ho Kim, Suwon-si (KR); Ho Jin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,482

(22) Filed: Jan. 17, 2020

(65) Prior Publication Data

US 2020/0149975 A1   May 14, 2020

Related U.S. Application Data

(63) Continuation of application No. 15/864,328, filed on Jan. 8, 2018, now Pat. No. 10,591,362, which is a (Continued)

(30) Foreign Application Priority Data

Sep. 2, 2013   (KR) .................. 10-2013-0105069

(51) Int. Cl.
   *G01K 7/01*   (2006.01)

(52) U.S. Cl.
   CPC ........... *G01K 7/01* (2013.01); *G01K 2215/00* (2013.01)

(58) Field of Classification Search
   None
   See application file for complete search history.

(56) References Cited

U.S. PATENT DOCUMENTS 5,440,305 A * 8/1995 Signore .................. G01K 7/01
                                                      341/120
6,101,610 A   8/2000 Beebe et al.
                        (Continued)

FOREIGN PATENT DOCUMENTS

KR   10-2006-0017333 A   2/2006
KR     10-0861371 B1    10/2008

OTHER PUBLICATIONS

Notice of Allowance issued in prior U.S. Appl. No. 14/474,783 dated Sep. 21, 2017.
(Continued)

*Primary Examiner* — Erica S Lin
(74) *Attorney, Agent, or Firm* — Sughrue Mion, PLLC

(57) ABSTRACT

A temperature sensor, a processor including the same, and a method of operating the same are provided. The temperature sensor includes: a reference circuit configured to receive a supply voltage provided from outside the processor and utilized by a logic block of the processor for operation of the logic block, and generate, using the supply voltage, at least one temperature information signal that varies according to a temperature of the logic block and at least one reference signal that is substantially constant relative to the temperature of the logic block; and a digital temperature generator configured to receive the at least one temperature information signal and the at least one reference signal generated by the reference circuit, and generate a digital temperature information signal indicative of the temperature of the logic
(Continued)

block based on the at least one temperature information signal and the at least one reference signal.

20 Claims, 14 Drawing Sheets

Related U.S. Application Data continuation of application No. 14/474,783, filed on Sep. 2, 2014, now Pat. No. 9,880,060.

(56) References Cited

U.S. PATENT DOCUMENTS

| | | | |
|---|---|---|---|
| 6,816,975 B1 | 11/2004 | Sasaki et al. | |
| 6,854,064 B2 | 2/2005 | Ahn | |
| 7,062,933 B2 | 6/2006 | Burns et al. | |
| 7,417,482 B2 | 8/2008 | Elgebaly et al. | |
| 7,937,599 B1 | 5/2011 | Thomas et al. | |
| 8,321,169 B2 | 11/2012 | Brooks et al. | |
| 2007/0067676 A1 | 3/2007 | Tsai | |
| 2008/0144415 A1* | 6/2008 | Macerola | G01K 7/01 365/211 |
| 2008/0317097 A1 | 12/2008 | Sohn | |
| 2009/0146719 A1 | 6/2009 | Pernia et al. | |
| 2011/0184686 A1 | 7/2011 | Brooks et al. | |
| 2012/0272098 A1 | 10/2012 | Cong | |
| 2012/0307867 A1 | 12/2012 | Chung et al. | |
| 2012/0319759 A1 | 12/2012 | Kobayashi | |
| 2013/0013937 A1 | 1/2013 | Koshimizu | |
| 2014/0169982 A1* | 6/2014 | Li | H02P 7/29 417/14 |
| 2014/0341258 A1* | 11/2014 | Chang | G01K 7/01 374/178 |

OTHER PUBLICATIONS

Office Action issued in prior U.S. Appl. No. 14/474,783 dated May 5, 2017.

Notice of Allowance issued in parent U.S. Appl. No. 15/864,328 dated Sep. 11, 2019.

Final Office Action issued in parent U.S. Appl. No. 15/864,328 dated Aug. 6, 2019.

Office Action issued in parent U.S. Appl. No. 15/864,328 dated Feb. 15, 2019.

* cited by examiner

FIG. 5B

| DVS MODE | DVDD LEVEL | DVSC | VDDC |
|---|---|---|---|
| 1 | 1.5 | 00 | Vdv4 |
| 2 | 1.2 | 01 | Vdv3 |
| 3 | 1.0 | 10 | Vdv2 |
| 4 | 0.8 | 11 | Vdv1 |

TEMPERATURE SENSOR EMBEDDED IN PROCESSOR, METHOD OF OPERATING THE SAME, AND DEVICES INCLUDING THE SAME

CROSS-REFERENCE TO RELATED APPLICATIONS

This is a continuation of U.S. application Ser. No. 15/864,328 filed on Jan. 8, 2018, which is a continuation of U.S. application Ser. No. 14/474,783 filed on Sep. 2, 2014 (now U.S. Pat. No. 9,880,060), which claims priority from Korean Patent Application No. 10-2013-0105069 filed on Sep. 2, 2013, the disclosure of which is hereby incorporated by reference in its entirety.

BACKGROUND

Apparatuses and methods consistent with exemplary embodiments relate to a temperature sensor, and more particularly, to a temperature sensor which is embedded in a digital circuit and uses a power supply of the digital circuit, devices including the same, and a method of operating the same.

As current and heat per unit area increases with the development of micro-fabrication processes, a temperature management system that allows mobile equipment to operate stably without experiencing thermal runaway is essential. Accordingly, a temperature sensor is usually embedded in mobile equipment. In the related art, temperature sensors are provided outside a processor and use an analog power supply separate from the power supply of the processor.

Accordingly, a pad, a bumper, a pin, a ball, a power line and so on are exclusively used to supply analog power to the temperature sensor are needed. In addition, since related art temperature sensors are positioned outside a processor, they cannot accurately sense the inner temperature of the processor that may be the most sensitive to the change in temperature.

SUMMARY

One or more exemplary embodiments provide a temperature sensor which is placed within a processor and uses power supplied to the processor and devices including the same.

One or more exemplary embodiments also provide a temperature sensor capable of operating stably even when the power level of a processor changes and devices including the same.

On or more exemplary embodiments also provide a temperature sensor capable of operating stably and compensating for errors in processes even in the low-power environment of a processor and devices including the same.

According to an aspect of an exemplary embodiment, there is provided a temperature sensor embedded in a logic block of a processor, the temperature sensor including a reference circuit configured to receive a supply voltage provided from outside the processor and utilized by the logic block for operation of the logic block, and generate, using the supply voltage, at least one temperature information signal that varies according to a temperature of the logic block and at least one reference signal that is substantially constant relative to the temperature of the logic block; and a digital temperature generator configured to receive the at least one temperature information signal and the at least one reference signal generated by the reference circuit, and generate a digital temperature information signal indicative of the temperature of the logic block based on the at least one temperature information signal and the at least one reference signal.

According to an aspect of another exemplary embodiment, there is provided a system on chip (SoC) including: a processor; and a temperature sensor embedded in the processor, the temperature sensor including: a reference circuit configured to receive a supply voltage provided from outside the system on chip and utilized for operation of the processor, and generate, using the supply voltage, first and second temperature information signals that vary according to a temperature of the processor, and first and second reference signals that are substantially constant relative to the temperature of the processor; and a digital temperature generator configured to receive the first and second temperature information signals and the first and second reference signals generated by the reference circuit, and generate a digital temperature information signal indicative of the temperature of the processor based on the first and second temperature information signals and the first and second reference signals.

According to an aspect of another exemplary embodiment, there is provided a electronic system including: a power source configured to supply an operating voltage; a storage device configured to store data; a memory configured to store data and programs; I/O ports configured to receive data transmitted to the electronic system or transmit data from the electronic system; a network device configured to communicably connect with a wired or wireless network; a display configured to display data output from at least one of the storage device, the memory, the I/O ports, and the network device; and a system on chip including a processor, and a temperature sensor embedded in the processor, the temperature sensor including: a reference circuit configured to receive a supply voltage provided from outside the system on chip and utilized for operation of the processor, and generate, using the supply voltage, first and second temperature information signals that vary according to a temperature of the processor, and first and second reference signals that are substantially constant relative to the temperature of the processor; and a digital temperature generator configured to receive the first and second temperature information signals and the first and second reference signals generated by the reference circuit, and generate a digital temperature information signal indicative of the temperature of the processor based on the first and second temperature information signals and the first and second reference signals.

BRIEF DESCRIPTION OF THE DRAWINGS

The above and/or other aspects will become more apparent by describing in detail exemplary embodiments with reference to the attached drawings in which:

FIG. 5B is a table illustrating the levels of a first supply voltage, a dynamic voltage scaling (DVS) control signal, and an output voltage of the fixed voltage generation circuit in each DVS mode according to an exemplary embodiment;

DETAILED DESCRIPTION

Figure 1:
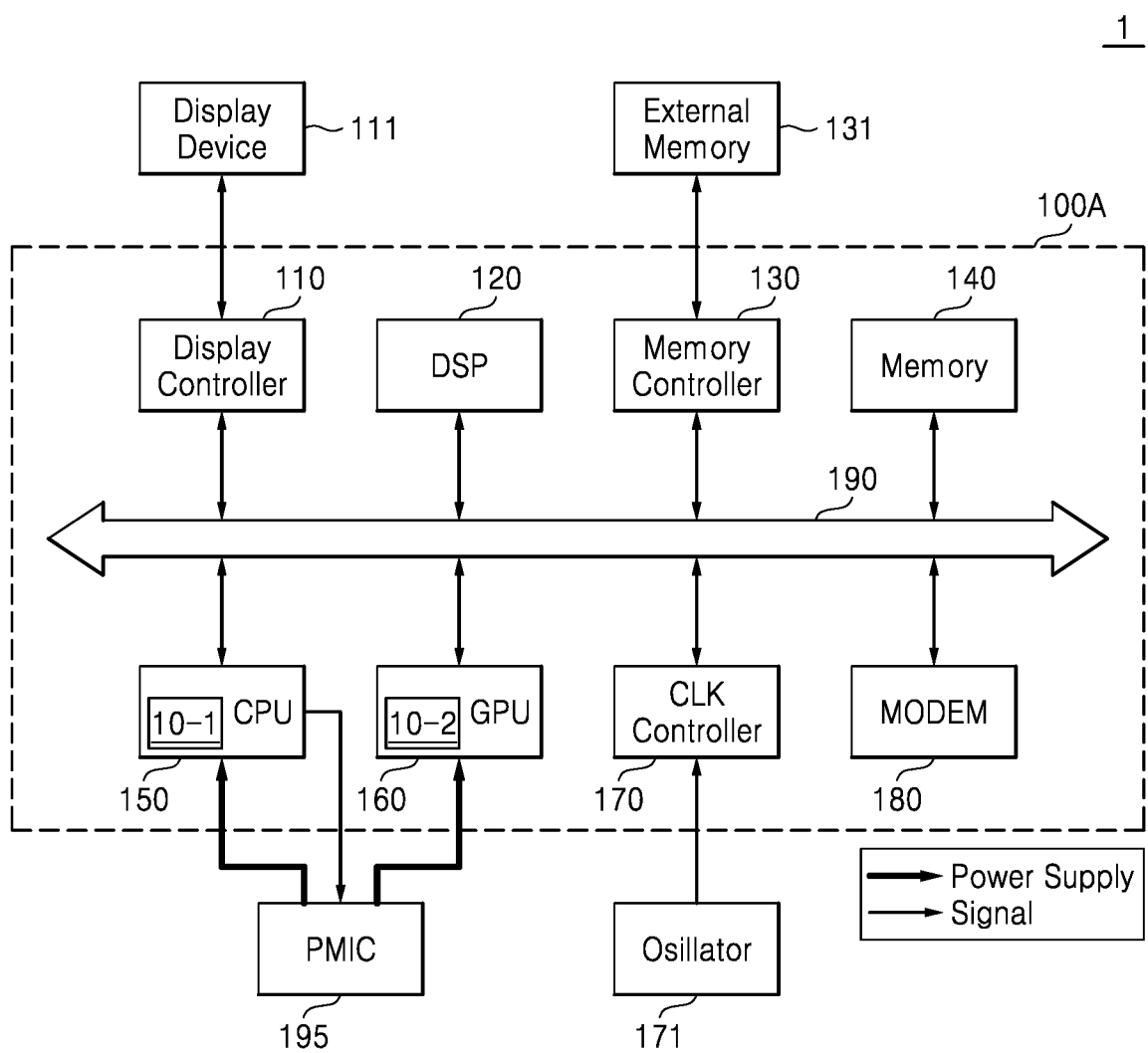
FIG. 1 is a block diagram of a semiconductor system including a system on chip (SoC) according to an exemplary embodiment.

Exemplary embodiments now will be described more fully hereinafter with reference to the accompanying drawings. The inventive concept, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a semiconductor system 1 including a system on chip (SoC) 100A according to an exemplary embodiment. The semiconductor system 1 may be implemented, for example, as a handheld device such as a mobile telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book. However, embodiments of the inventive concept are not limited to these exemplary handheld devices or to a handheld device.

In addition to the SoC 100A, the semiconductor system 1 may include a display device 111, an external memory 131, an oscillator 171, and a power management integrated circuit (PMIC) 195. The SoC 100A may be an application processor. The application processor may control overall operations of the semiconductor system 1.

The SoC 100A may include a display controller 110, a digital signal processor (DSP) 120, a memory controller 130, an internal memory 140, a central processing unit (CPU) 150, a graphics processing unit (GPU) 160, a clock controller 170, a modem 180, and a bus 190. The SoC 100A may also include other elements, e.g., an accelerator, a television (TV) processor, and an interface circuit.

The CPU 150 may execute programs and/or process data stored in the external memory 131 or the internal memory 140. For instance, the CPU 150 may execute the programs and/or process the data in response to an operating clock signal output from the clock controller 170.

The CPU 150 may be implemented by a multi-core processor. The multi-core processor is a single computing component with two or more independent actual processors (referred to as "cores"). Each of the processors may read and execute program instructions. The multi-core processor can drive a plurality of accelerators at a time, and therefore, a data processing system including the multi-core processor may perform multi-acceleration.

The CPU 150 includes a temperature sensor 10-1 which measures the temperature inside of the CPU 150. In other words, the temperature sensor 10-1 is embedded in the CPU 150. The temperature sensor 10-1 senses the inner temperature of the CPU 150 using a first supply voltage supplied from the PMIC 195 to the CPU 150. In the case where the CPU 150 includes one or more cores, the temperature sensor 10-1 may be embedded in each core. The first supply voltage is not a special or dedicated voltage supplied for only the temperature sensor 10-1 but is a voltage supplied for the operation of the core or internal circuits of the CPU 150.

The CPU 150 may manage its inner temperature by changing its power supply voltage and/or operating frequency using inner temperature information sensed by the temperature sensor 10-1.

The GPU 160 may reduce the load of the CPU 150 and may also read and execute program instructions for graphics processing. The GPU 160 may receive data output from the external memory 131 or the internal memory 140 and may process and transmit data to the external memory 131 or the internal memory 140. For instance, the GPU 160 may execute a program and/or process data in response to an operating clock signal output from the clock controller 170.

Similar to the CPU 150, the GPU 160 may also include a temperature sensor 10-2 which measures the temperature inside of the GPU 160. The temperature sensor 10-2 senses the inner temperature of the GPU 160 using a second supply voltage supplied from the PMIC 195 to the GPU 160. The second supply voltage is not a special or dedicated voltage supplied for only the temperature sensor 10-2 but is a voltage supplied for the operation of the core or internal circuits of the GPU 160.

The programs and/or the data stored in the external memory 131 and/or the internal memory 140 may be loaded to a memory in the CPU 150 or the GPU 160 when necessary.

The internal memory 140 may include read-only memory (ROM) and random access memory (RAM).

The ROM may store permanent programs and/or data. The ROM may be implemented by erasable programmable ROM (EPROM) or electrically erasable programmable ROM (EEPROM).

The RAM may temporarily store programs, data, or instructions. For instance, the programs and/or data stored in the external memory 131 may be temporarily stored in the RAM according to the control of the CPU 150 or a booting code stored in the ROM. The RAM may be implemented by dynamic RAM (DRAM) or static RAM (SRAM).

The memory controller 130 is used for the interface with the external memory 131. The memory controller 130 controls the overall operation of the external memory 131 and generally controls the data communication between a host and the external memory 131. For instance, the memory controller 130 controls the external memory 131 to write or read data at the request of the host. The host may be a master device such as the CPU 150, the GPU 160, or the display controller 110.

The external memory 131 is a storage medium for storing data and may store an operating system (OS) and various kinds of programs and data. The external memory 131 may be implemented by DRAM, but the inventive concept is not restricted to the current embodiments. The external memory 131 may be implemented by non-volatile memory such as flash memory, phase-change RAM (PRAM), magnetoresistive RAM (MRAM), resistive RAM (ReRAM) or ferroelectric RAM (FeRAM).

The elements 110 through 180 of the SoC 100A may communicate with one another through the bus 190.

The display device 111 may display data according to the control of the display controller 110. The display device 111 is a liquid crystal display (LCD) device in the current embodiments, but the inventive concept is not restricted to the current embodiments. In other embodiments, the display device 111 may be a light emitting diode (LED) display device, an organic LED (OLED) display device, a plasma display panel (PDP) device or another type of display device.

The display controller 110 controls the operations of the display device 111.

Figure 2:
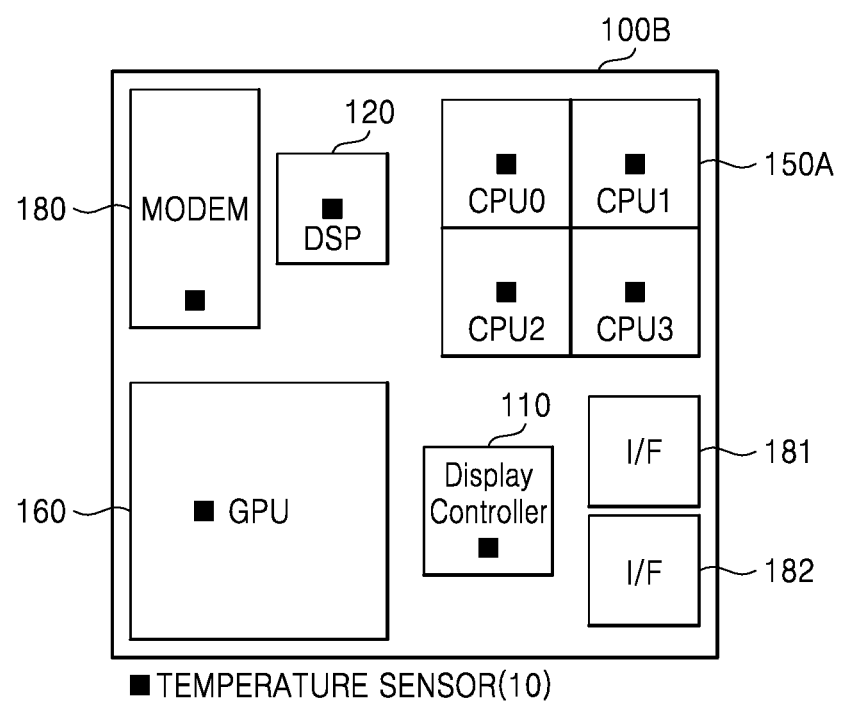
FIG. 2 is a schematic diagram of the structure of a SoC according to another exemplary embodiment.

FIG. 2 is a schematic diagram of the structure of a SoC 100B according to another exemplary embodiment. Referring to FIG. 2, the SoC 100B may include at least one processor. The at least one processor may include a CPU 150A, the GPU 160, and the DSP 120. The SoC 100B may also include the modem 180, interface circuits (I/F) 181 and 182, and the display controller 110.

As shown in FIG. 2, each of the DSP 120, the CPU 150A, and the GPU 160 may include a temperature sensor 10 embedded therein. Other functional modules, e.g. the display controller 110 and the modem 180, may also include the temperature sensor 10 embedded therein.

The DSP 120, the CPU 150A, and the GPU 160 may also include a pad, a pin, and/or a ball to receive supply power (hereinafter, referred to as "processor power") provided from an external supply source. The DSP 120, the CPU 150A, and the GPU 160 may also include a power supply line for supplying the processor power, which is received through a pad, pin, and/or ball, to the internal circuit.

The temperature sensors 10 are embedded within the DSP 120, the CPU 150A, and the GPU 160 and sense the inner temperatures of the DSP 120, the CPU 150A, and the GPU 160 using the processor power.

In the exemplary embodiment, the CPU 150A is a quad-core processor including four cores CPU0 through CPU3, but the inventive concept is not restricted to the current embodiments and the number of cores may be more or less than four. The cores CPU0 through CPU3 may be homogeneous or heterogeneous. As described above, in the case where the CPU 150A includes a plurality of cores, a temperature sensor 10 is embedded in each core and the temperature sensor operates using a voltage supplied to the core.

Figure 3:
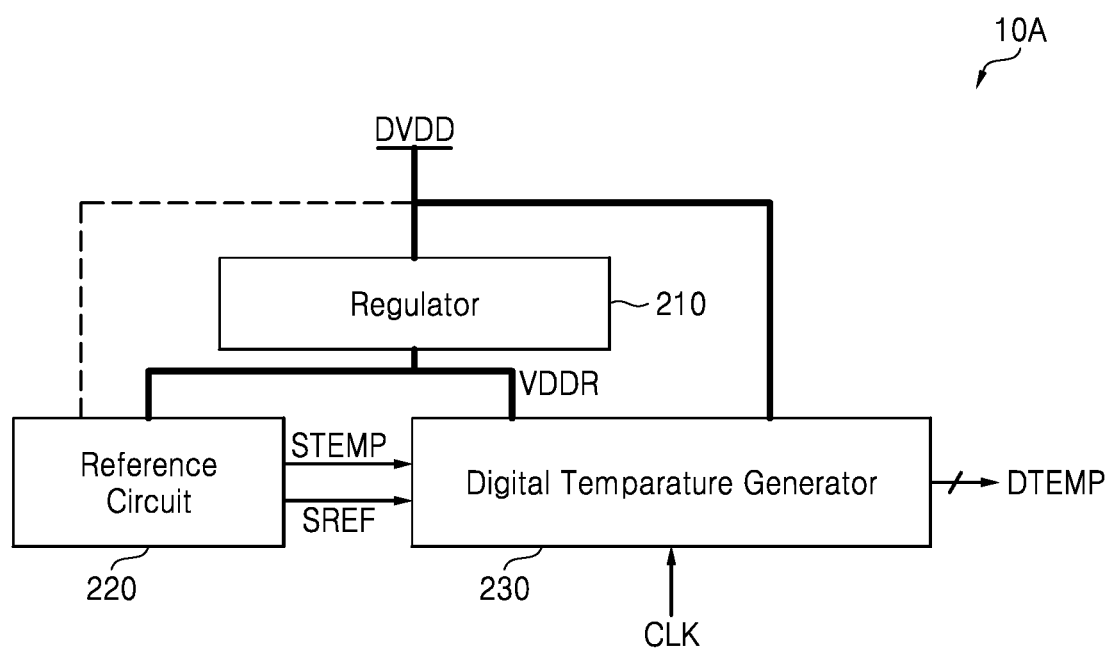
FIG. 3 is a block diagram of the structure of a temperature sensor according to an exemplary embodiment.

FIG. 3 is a block diagram of the structure of a temperature sensor 10A according to an exemplary embodiment. The temperature sensor 10A includes a reference circuit 220 and a digital temperature generator 230. The temperature sensor 10A may also include a regulator 210.

The regulator 210 receives a supply voltage DVDD and generates a regulated voltage VDDR at a constant level.

The reference circuit 220 generates a temperature information signal STEMP which changes according to temperature and a reference signal SREF which is constant regardless of temperature. For instance, the reference circuit 220 generates first and second temperature information signals, which change according to temperature, and first and second reference signals, which are substantially constant regardless of temperature.

The digital temperature generator 230 generates digital temperature information DTEMP using the temperature information signal STEMP and the reference signal SREF. The temperature information signal STEMP and the reference signal SREF may be analog signals, e.g., analog voltage signals or analog current signals. The digital temperature generator 230 may convert the temperature information signal STEMP and the reference signal SREF into digital signals, respectively, and may generate the digital temperature information DTEMP by performing an operation on the digital signals. The structure and operation of the digital temperature generator 230 will be described later.

Although the temperature sensor 10A includes the regulator 210 in the embodiments illustrated in FIG. 3, the regulator 210 may be omitted in other embodiments, in which case the supply voltage DVDD may be supplied to the reference circuit 220 (as shown by the dashed line in FIG. 3). In further embodiments, an additional power supply circuit, e.g., a charge pump circuit, a DC-DC converter, or a low drop out (LDO) regulator may also be provided. The additional power supply circuit generates a voltage, which will be input to the digital temperature generator 230, from the supply voltage DVDD.

Accordingly, the temperature sensor 10A may directly use the supply voltage DVDD, i.e., the power supplied to a processor or may use a voltage generated from the supply voltage DVDD using the additional power supply circuit. The power supplied to the processor, i.e., the supply voltage DVDD is not special or dedicated voltage supplied only to the temperature sensor 10A but instead is a voltage supplied to the processor for the operation of the core or internal circuits of the processor.

Figure 4:
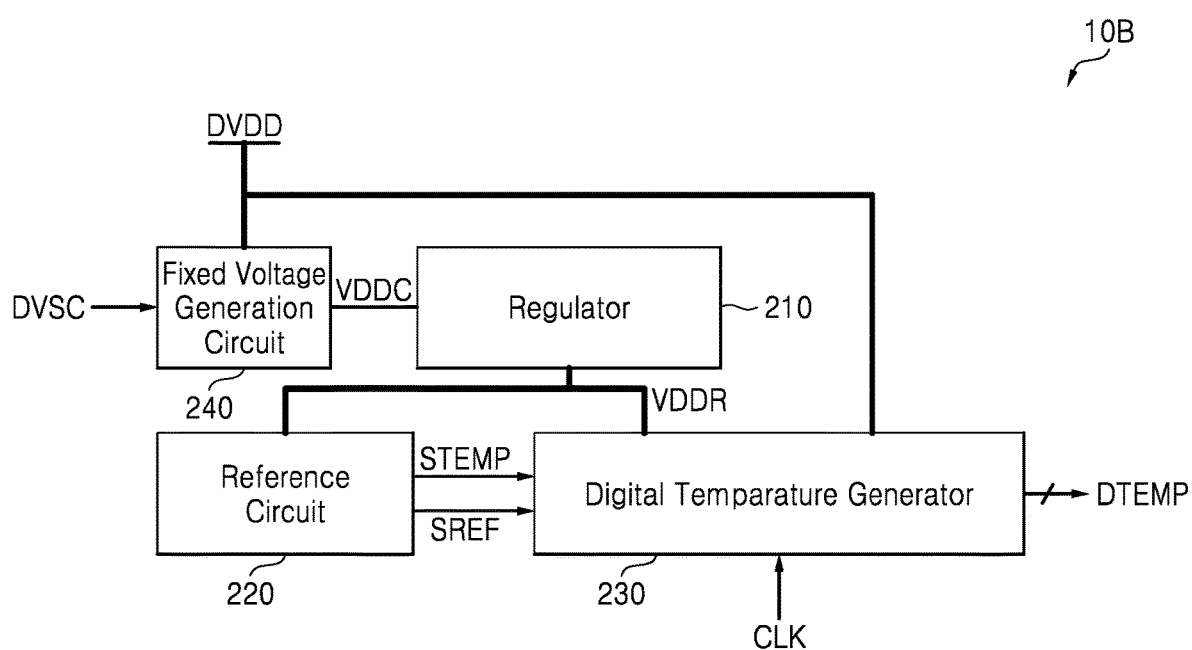
FIG. 4 is a block diagram of the structure of a temperature sensor according to another exemplary embodiment.

FIG. 4 is a block diagram of the structure of a temperature sensor 10B according to another exemplary embodiment. The temperature sensor 10B illustrated in FIG. 4 is similar to the temperature sensor 10A illustrated in FIG. 3, but further includes a fixed voltage generation circuit 240. The regulator 210, the reference circuit 220, and the digital temperature generator 230 of the temperature sensor 10B are the same as those of the temperature sensor 10A illustrated in FIG. 3. Thus, description thereof will not be repeated to avoid redundancy.

The level of the supply voltage DVDD may vary with the operation mode (e.g., dynamic voltage scaling (DVS) mode) of the DSP 120, the CPU 150 150A, or the GPU 160, the SoC 100A or 100B, or the semiconductor system 1 in which the temperature sensor 10B is included.

When the semiconductor system 1 is implemented in mobile equipment, a DVS scheme may be used to reduce power consumption.

The DVS scheme allows the level of a voltage supplied to the DSP 120, the CPU 150 or 150A, or the GPU 160 to be adjusted dynamically. Performance and power consumption is in a trade-off relationship with each other. Accordingly, when the performance is lowered to reduce the power consumption, the supply voltage may be decreased. Contrarily, when the performance is raised up even through the power consumption is increased, the supply voltage may be increased.

The fixed voltage generation circuit 240 outputs a voltage at a constant level even when the level of a voltage supplied to the DSP 120, the CPU 150 or 150A, or the GPU 160 changes according to the DVS scheme.

Figure 5A:
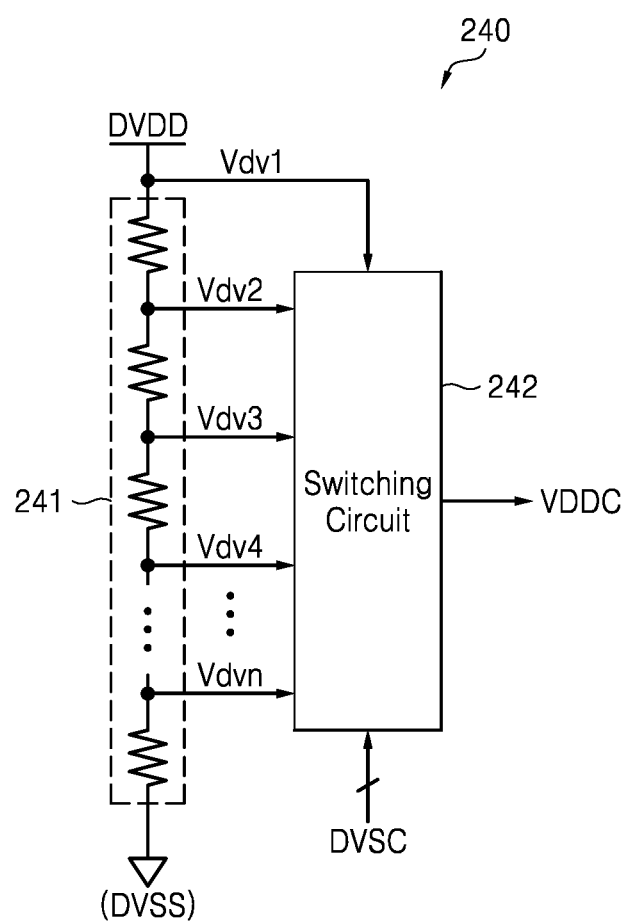
FIG. 5A is a circuit diagram of a fixed voltage generation circuit according to an exemplary embodiment.

FIG. 5A is a circuit diagram of the fixed voltage generation circuit 240 illustrated in FIG. 4 according to an exemplary embodiment. Referring to FIG. 5A, the fixed voltage generation circuit 240 includes a resistor string circuit 241 and a switching circuit 242. The resistor string circuit 241 includes a plurality of resistors connected between the first supply voltage DVDD and a second power supply voltage DVSS. The resistor string circuit 241 divides the first supply voltage DVDD into a plurality of divided voltages Vdv1 through Vdvn (i.e., "n" voltages. where "n" is an integer of greater than or equal to 2). The second power supply voltage DVSS may be a ground voltage but is not limited thereto.

The switching circuit 242 selects and outputs one of the divided voltages Vdv1 through Vdvn as an output voltage VDDC according to a DVS control signal DVSC.

The DVS control signal DVSC is a signal for controlling the switching circuit 242 according to the DVS mode. It may be generated by the CPU 150.

For instance, the CPU 150 may generate a PMIC control signal and apply the PMIC control signal to the PMIC 195 to select one of a plurality of DVS modes according to the DVS scheme. The PMIC 195 may change the level of a power supply voltage supplied to a processor according to the PMIC control signal. Therefore, the DVS control signal DVSC is related to both the DVS mode and the PMIC control signal.

FIG. 5B is a table illustrating the levels of the first supply voltage DVDD, the DVS control signal DVSC, and the output voltage VDDC of the fixed voltage generation circuit 240 in each DVS mode according to an exemplary embodiment.

Referring to FIG. 5B, in a first DVS mode, the level of the first supply voltage DVDD is controlled to be the highest (e.g., 1.5 V) and the DVS control signal DVSC is set to "00", so that the output voltage VDDC of the fixed voltage generation circuit 240 may be the divided voltage Vdv4.

In a second DVS mode, the level of the first supply voltage DVDD is controlled to be the second highest (e.g., 1.2 V) and the DVS control signal DVSC is set to "01", so that the output voltage VDDC of the fixed voltage generation circuit 240 may be the divided voltage Vdv3.

In third and fourth DVS modes, the level of the first supply voltage DVDD, the DVS control signal DVSC, and the output voltage VDDC of the fixed voltage generation circuit 240 may be as shown in the table illustrated in FIG. 5B. Although specific values are illustrated in FIG. 5B, the inventive concept is not restricted thereto and various different values may be utilized.

Figure 6:
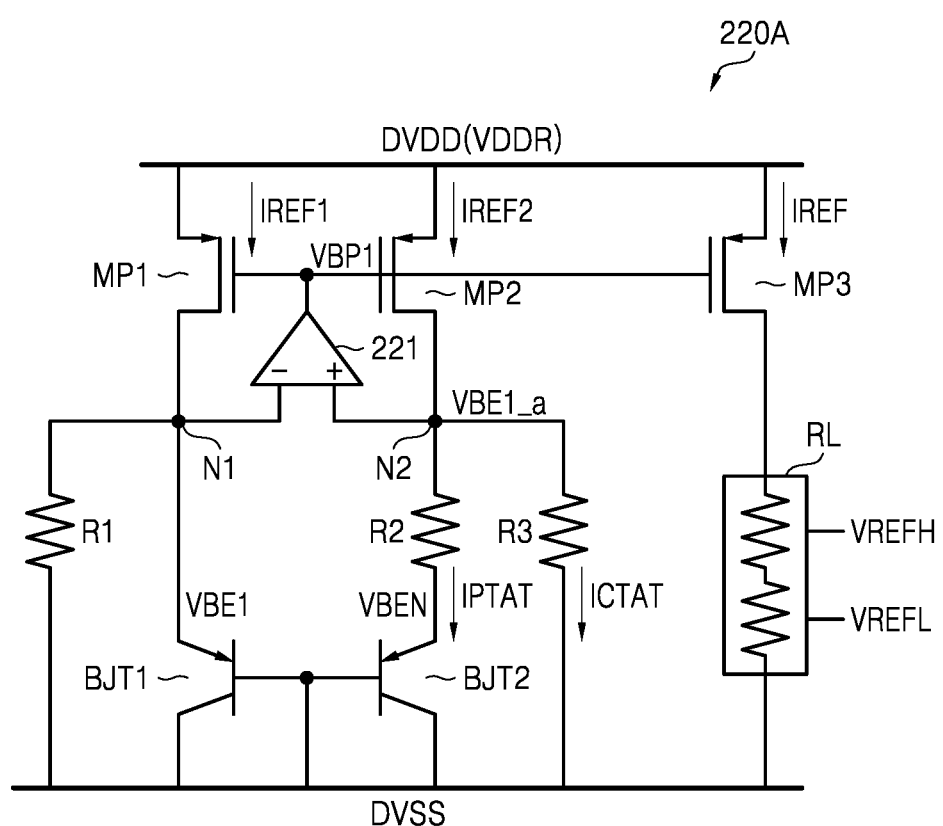
FIG. 6 is a circuit diagram of a reference circuit according to an exemplary embodiment.

FIG. 6 is a circuit diagram of a reference circuit 220A according to an exemplary embodiment. The reference circuit 220 illustrated in FIGS. 3 and 4 may be implemented as the reference circuit 220A but is not limited thereto. Referring to FIG. 6, the reference circuit 220A may be a bandgap reference circuit and include first through third P-channel metal oxide semiconductor (PMOS) transistors MP1, MP2, and MP3, first and second bipolar junction transistors (BJTs) BJT1 and BJT2, an operational amplifier 221, first through third loads R1, R2, and R3, and an output load RL.

The first PMOS transistor MP1 is connected between the first supply voltage DVDD (or the regulated voltage VDDR if the regulator 210 is included in the temperature sensor) and a first node N1. The second PMOS transistor MP2 is connected between the first supply voltage DVDD (or the regulated voltage VDDR if the regulator 210 is included in the temperature sensor) and a second node N2. The third PMOS transistor MP3 is connected between the first supply voltage DVDD (or regulated voltage VDDR if the regulator 210 is included in the temperature sensor) and the output load RL.

The first BJT BJT1 and the first load R1 are connected in parallel with each other between the first node N1 and the second power supply voltage DVSS.

The second load R2 and the second BJT BJT2 are connected in series with each other between the second node N2 and the second power supply voltage DVSS. The third load R3 is connected between the second node N2 and the second power supply voltage DVSS. The bases of the respective first and second BJTs BJT1 and BJT2 are connected in common to the second power supply voltage DVSS.

The size of the second BJT BJT2 may be N (which is a real number greater than 1) times greater than that of the first BJT BJT1. When N is an integer of at least 2, the second BJT BJT2 may be formed by connecting N BJTs having the same size as the first BJT BJT1 in parallel with each other.

The operational amplifier 221 receives a signal of the first node N1 and a signal of the second node N2 as input signals. An output node of the operational amplifier 221 is connected in common to gates of the respective first and second PMOS transistors MP1 and MP2.

A gate of the third PMOS transistor MP3 is connected in common to the gates of the respective first and second PMOS transistors MP1 and MP2. The output load RL is connected between a drain of the third PMOS transistor MP3 and the second power supply voltage DVSS.

Typically, a base-emitter voltage VBE of a BJT is inversely proportional to temperature. The voltage of the first node N1 is a base-emitter voltage VBE1 of the first BJT BJT1. Accordingly, the first node voltage VBE1 decreases as the temperature increases. As a result, a voltage across the first load R1 decreases and current flowing in the first load R1 has a complementary-to-absolute temperature (CTAT) characteristic, that is, the current is in inverse proportion to absolute temperature.

A base-emitter voltage VBEN of the second BJT BJT2 also decreases as the temperature increases. Since the size of the second BJT BJT2 is N times of that of the first BJT BJT1, a variation of the base-emitter voltage VBEN of the second BJT BJT2 with respect to the temperature is greater than that of the base-emitter voltage VBE1 of the first BJT BJT1 with respect to the temperature.

Both input signals of the operational amplifier 221 are substantially the same as each other, and therefore, a voltage VBE1_a of the second node N2 is substantially the same as the voltage VBE1 of the first node N1. Accordingly, the second node voltage VBE1_a also decreases as the temperature increases and a voltage across the third load R3 also decreases, so that a current ICTAT flowing in the third load R3 has the CTAT characteristic.

However, a variation of the second node voltage VBE1_a with respect to the temperature is less than that of the base-emitter voltage VBEN of the second BJT BJT2 with respect to the temperature, and therefore, a voltage difference between both ends of the second load R2 increases as the temperature increases. Accordingly, a current IPTAT flowing in the second load R2 has a proportional-to-absolute temperature (PTAT) characteristic.

The sum of the current IPTAT flowing in the second load R2 and the current ICTAT flowing in the third load R3 is a second reference current IREF2. The PTAT characteristic of the current IPTAT flowing in the second load R2 may be compensated or offset by the CTAT characteristic of the current ICTAT flowing in the third load R3.

An output current IREF flowing into the output load RL through the third PMOS transistor MP3 is substantially the same as the second reference current IREF2. The product of the output load RL and the output current IREF, i.e., a voltage across the output load RL can be maintained constant. For instance, though the output current IREF varies with the temperature since the second reference current IREF2 varies with the temperature, the product of the output load RL and the output current IREF can be maintained constant. Consequently, reference voltages VREFH and VREFL that are constant regardless of the temperature can be obtained from the output load RL.

In the current exemplary embodiments, the first and second reference voltages VREFH and VREFL have different levels from each other. For example, the first reference voltage VREFH is higher than the second reference voltage VREFL.

As described above, the reference circuit 220A generates the first and second temperature information voltages VBE1 and VBEN that vary with the temperature and the first and second reference voltages VREFH and VREFL that are constant regardless of the temperature. In other words, it is not necessary to separately provide a circuit that generates the temperature information voltages VBE1 and VBEN varying with the temperature and a circuit that generates the reference voltages VREFH and VREFL constant regardless of the temperature.

Herein, the phrase "constant regardless of the temperature" does not mean being completely the same physically or without any variation but instead means substantially constant with a slight variation that can be relatively ignored as compared to the variation of the values (e.g., VBE1 and VBEN) varying with the temperature.

Figure 7:
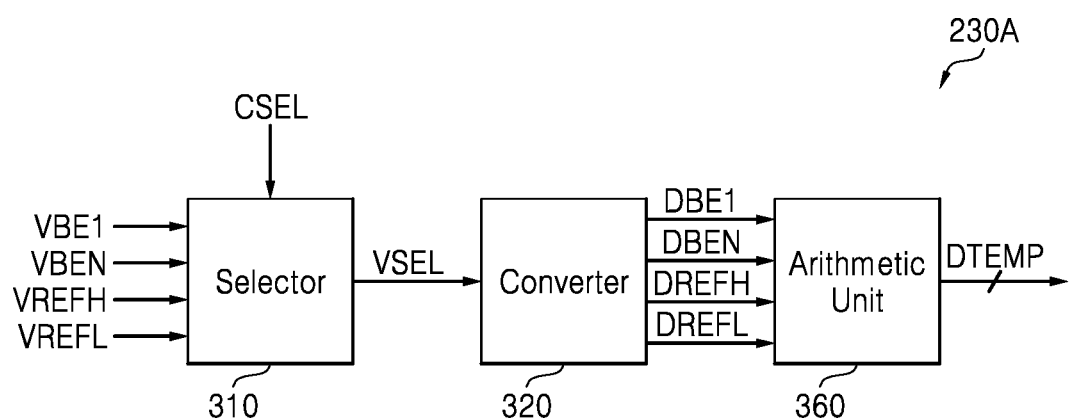
FIG. 7 is a block diagram of the structure of a digital temperature generator according to an exemplary embodiment.

FIG. 7 is a block diagram of the structure of a digital temperature sensor 230A according to an exemplary embodiment. The digital temperature generator 230 illustrated in FIGS. 3 and 4 may be implemented as the digital temperature sensor 230A. Referring to FIG. 7, the digital temperature generator 230A includes a converter 320 and an arithmetic unit 360.

The converter 320 converts first and second temperature information signals and first and second reference signals, which are output from the reference circuit 220, into first and second digital temperature codes and first and second digital reference codes, respectively. For instance, the converter 320 may convert the first and second temperature information voltages VBE1 and VBEN and the first and second reference voltages VREFH and VREFL, which are analog voltage signals, into first and second digital temperature codes DBE1 and DBEN and first and second digital reference codes DREFH and DREFL, respectively, which are digital signals. The converter 320 may receive the first and second temperature information voltages VBE1 and VBEN and the first and second reference voltages VREFH and VREFL in parallel and convert them into the first and second digital temperature codes DBE1 and DBEN and the first and second digital reference codes DREFH and DREFL, in parallel.

However, in the exemplary embodiment illustrated in FIG. 7, the converter 320 sequentially receives the first and second temperature information voltages VBE1 and VBEN and the first and second reference voltages VREFH and VREFL and sequentially converts them into the first and second digital temperature codes DBE1 and DBEN and the first and second digital reference codes DREFH and DREFL, respectively.

For the sequential conversion, a selector 310 that sequentially selects the first and second temperature information voltages VBE1 and VBEN and the first and second reference voltages VREFH and VREFL may be provided before the converter 320. The selector 310 sequentially selects the first temperature information voltage VBE1, the second temperature information voltage VBEN, the first reference voltage VREFH, and the second reference voltage VREFL and outputs the selected one as a selected voltage VSEL according to a selection control signal CSEL.

Figure 8:
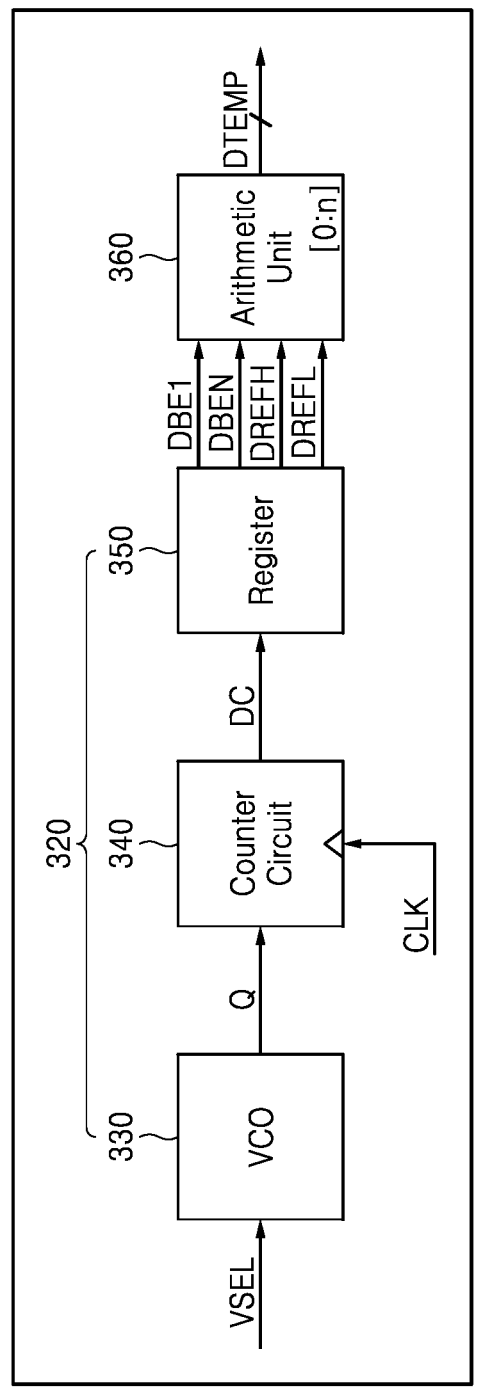
FIG. 8 is a block diagram of the structure of a converter according to an exemplary embodiment.

FIG. 8 is a block diagram of the structure of the converter 320 illustrated in FIG. 7 according to an exemplary embodiment. Referring to FIG. 8, the converter 320 may include a voltage-controlled oscillator (VCO) 330, a counter circuit 340, and a register 350.

The VCO 330 outputs an oscillation signal Q whose frequency varies with the voltage level of an input signal. The counter circuit 340 counts the oscillation signal Q using a reference clock signal CLK and outputs a count value.

The register 350 stores the count value output from the counter circuit 340.

However, the structure of the converter 320 is not limited to that shown in FIG. 8. For example, the VCO 330 and the counter circuit 340 of the converter 320 can be replaced with another type of analog-to-digital converter (ADC) such as a successive-approximation register (SAR) ADC, a Delta-Sigma ADC, etc.

Figure 9:
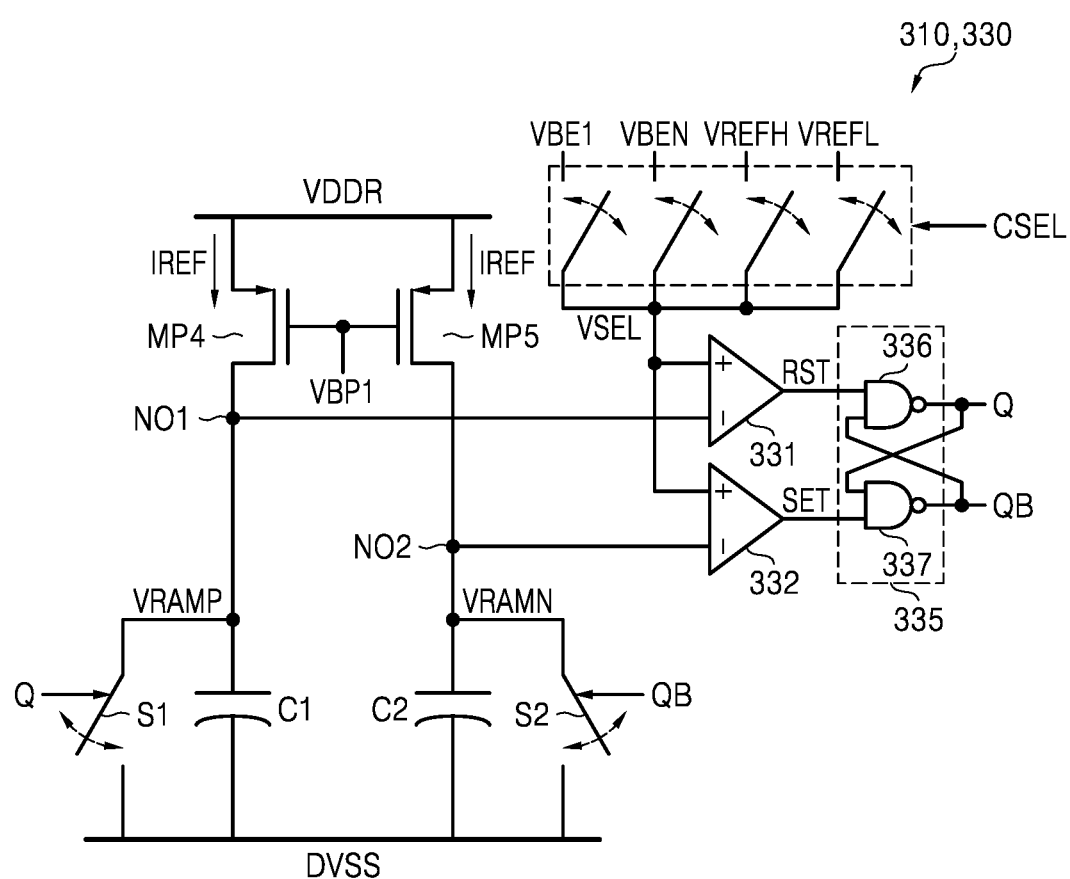
FIG. 9 is a circuit diagram of a selector and a voltage-controlled oscillator (VCO) according to an exemplary embodiment.

FIG. 9 is a circuit diagram of the selector 310 and the VCO 330 illustrated in FIG. 8 according to an exemplary embodiment. Referring to FIG. 9, the selector 310 selects and outputs one of the first and second temperature information voltages VBE1 and VBEN and the first and second reference voltages VREFH and VREFL as the selected voltage VSEL according to the selection control signal CSEL.

The VCO 330 includes first and second oscillation transistors MP4 and MP5, first and second capacitors C1 and C2, first and second switches S1 and S2, first and second comparators 331 and 332, and a latch 335.

The first oscillation transistor MP4 is connected between a first power supply voltage VDDR and a first output node NO1. A gate of the first oscillation transistor MP4 is connected in common to the gates of the respective first through third PMOS transistors MP1 through MP3. The second oscillation transistor MP5 is connected between the first power supply voltage VDDR and a second output node NO2. A gate of the second oscillation transistor MP5 is connected with the gate of the first oscillation transistor MP4.

The first capacitor C1 is connected between the first output node NO1 and the second power supply voltage DVSS. The second capacitor C2 is connected between the second output node NO2 and the second power supply voltage DVSS. The first and second capacitors C1 and C2 have substantially the same capacitance C.

The first switch S1 is connected in parallel with the first capacitor C1 and is opened or closed in response to a latch output signal Q. The second switch S2 is connected in parallel with the second capacitor C2 and is opened or closed in response to an inverted latch output signal QB.

The first comparator 331 compares the output signal VSEL of the selector 310 with a signal VRAMP of the first output node NO1. The second comparator 332 compares the output signal VSEL of the selector 310 with a signal VRAMN of the second output node NO2.

The latch 335 latches an output signal of the first and second comparators 331 and 332.

Figure 10:
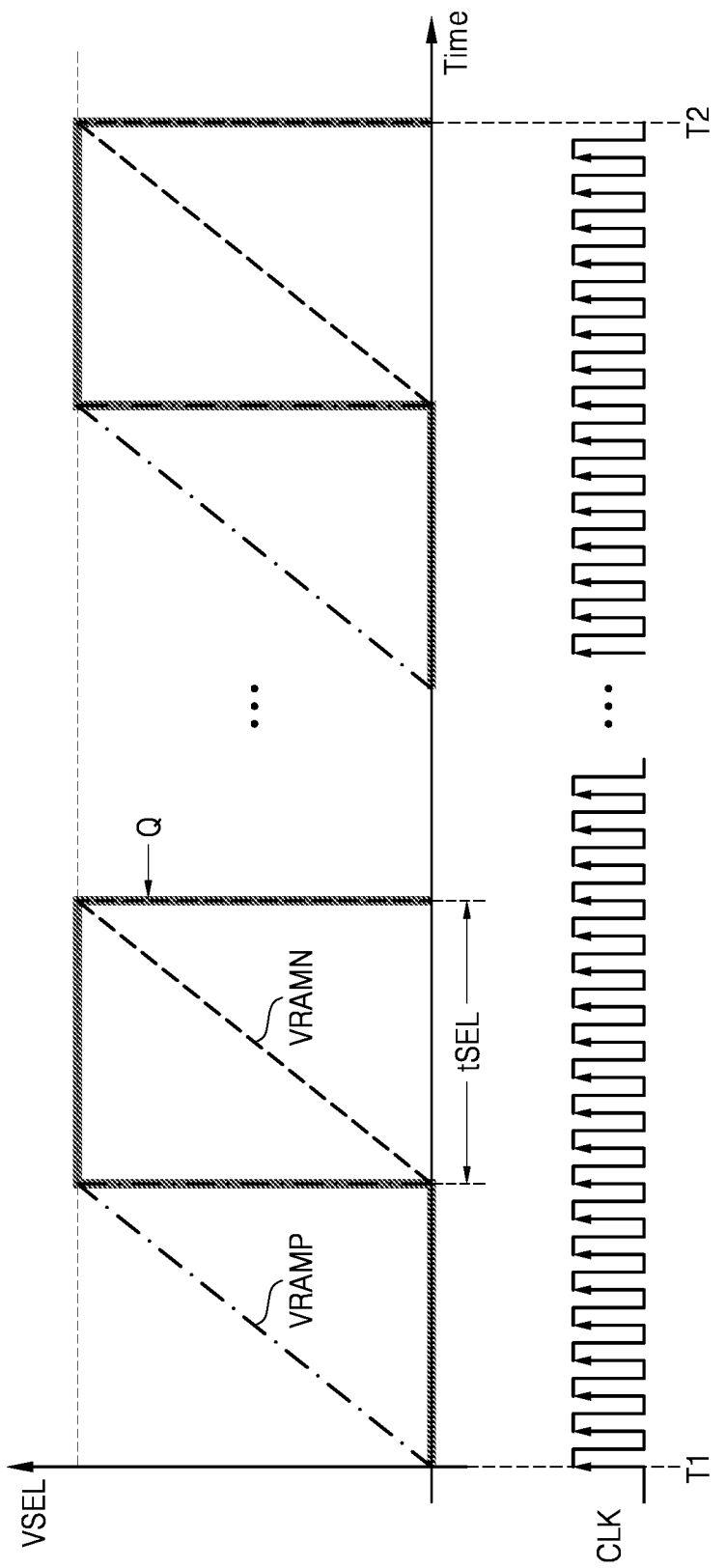
FIG. 10 is a schematic waveform diagram of some signals of the VCO illustrated in FIG. 9.

FIG. 10 is a schematic waveform diagram of some signals of the VCO 330 illustrated in FIG. 9. Referring to FIGS. 9 and 10, while the latch output signal Q is at a first logic level (e.g., "0") and the inverted latch output signal QB is at a second logic level (e.g., "1"), the first switch S1 is opened and the second switch S2 is closed. Accordingly, the voltage VRAMP of the first output node NO1 increases over time. While the voltage VRAMP of the first output node NO1 is lower than the output voltage VSEL of the selector 310, an output signal RST of the first comparator 331 is "1". When the voltage VRAMP of the first output node NO1 is the same as the output voltage VSEL of the selector 310, the output signal RST of the first comparator 331 becomes "0". When the output signal RST of the first comparator 331 becomes "0", the latch output signal Q transits to "1". Then, the first switch S1 is closed and the second switch S2 is opened. Accordingly, the voltage VRAMN of the second output node NO2 increases over time. While the voltage VRAMN of the second output node NO2 is lower than the output voltage VSEL of the selector 310, an output signal SET of the second comparator 332 is "1". When the voltage VRAMN of the second output node NO2 is the same as the output voltage VSEL of the selector 310, the output signal SET of the second comparator 332 becomes "0". When the output signal SET of the second comparator 332 becomes "0", the inverted latch output signal QB transits to "1".

As described above, periods in which the voltage VRAMP of the first output node NO1 increases up to the output voltage VSEL of the selector 310, i.e., periods in which the latch output signal Q is "0" and the inverted latch output signal QB is "1" alternate with periods in which the voltage VRAMN of the second output node NO2 increases up to the output voltage VSEL of the selector 310, i.e., periods in which the latch output signal Q is "1" and the inverted latch output signal QB is "0". Accordingly, the oscillation signal Q having a regular period is output.

½ period tSEL or a single period of the oscillation signal Q varies with the level of the output voltage VSEL of the selector 310, the capacitance C of the first and second capacitors C1 and C2, and the intensity of the reference current IREF. For instance, as the output voltage VSEL of the selector 310 increases, the ½ period tSEL of the oscillation signal Q also increases. As the capacitance C of the first and second capacitors C1 and C2 decreases, the ½ period tSEL of the oscillation signal Q also decreases.

When the capacitance C of the first and second capacitors C1 and C2 and the intensity of the reference current IREF are constant, the period (or frequency) of the oscillation signal Q varies with the output voltage VSEL of the selector 310.

Referring back to FIG. 8, the oscillation signal Q output from the VCO 330 is input to the counter circuit 340.

The counter circuit 340 may include, for example, a master counter which generates an enable signal which maintains a high state from a first rising edge of the oscillation signal Q during predefined cycles, and a slave counter which counts the reference clock signal CLK during the enable signal generated by the master counter. An output of the slave counter is a digital code DC resulting from converting the selected output voltage VSEL into a digital code.

The register 350 stores the digital code DC output from the second counter 342.

Since the selector 310 sequentially selects the first temperature information voltage VBE1, the second temperature information voltage VBEN, the first reference voltage VREFH, and the second reference voltage VREFL, digital codes, i.e., the first temperature information code DBE1, the second temperature information code DBEN, the first reference code DREFH, and the second reference code DREFL respectively corresponding to the first temperature information voltage VBE1, the second temperature information voltage VBEN, the first reference voltage VREFH, and the second reference voltage VREFL are sequentially stored in the register 350.

The arithmetic unit 360 receives the first temperature information code DBE1, the second temperature information code DBEN, the first reference code DREFH, and the second reference code DREFL, performs an operation on them, and outputs the digital temperature information signal DTEMP. The arithmetic unit 360 may calculate a first difference signal between the first temperature information code DBE1 and the second temperature information code DBEN and a second difference signal between the first reference code DREFH and the second reference code DREFL and may obtain the digital temperature information signal DTEMP by calculating a ratio between the first difference signal and the second difference signal.

The arithmetic unit 360 may calculate the digital temperature information signal DTEMP using Equation 1 as follows:

$$DTEMP = \frac{DBE1 - DBEN}{DREFH - DREFL} \qquad \text{(Equation 1)}$$

$$= \frac{K \cdot C \cdot VBE1/IREF - K \cdot C \cdot VBEN/IREF}{K \cdot C \cdot VREFH/IREF - K \cdot C \cdot VREFL/IREF}$$

$$= \frac{G(VBE1 - VBEN)}{G(VREFH - VREFL)},$$

where C is the capacitance of the first and second capacitors C1 and C2, K is a digital converting constant value, and G is K·C/IREF.

As shown in Equation 1, even when the capacitance C changes, the influence of the capacitance C exerted on the digital temperature information signal DTEMP is counterbalanced through division. In addition, when the temperature does not change while the first temperature information code DBE1, the second temperature information code DBEN, the first reference code DREFH, and the second reference code DREFL are generated, the reference current IREF does not influence the digital temperature information signal DTEMP. Moreover, errors such as charge-injection that may occur during the operation of switches and a comparator offset are counterbalanced through subtraction in the denominator and numerator in Equation 1. Accordingly, most of the errors occurring in the VCO 330 can be solved using Equation 1. Therefore, errors or offsets occurring in processes are compensated for, so that the accuracy of temperature sensing is increased.

Figure 11:
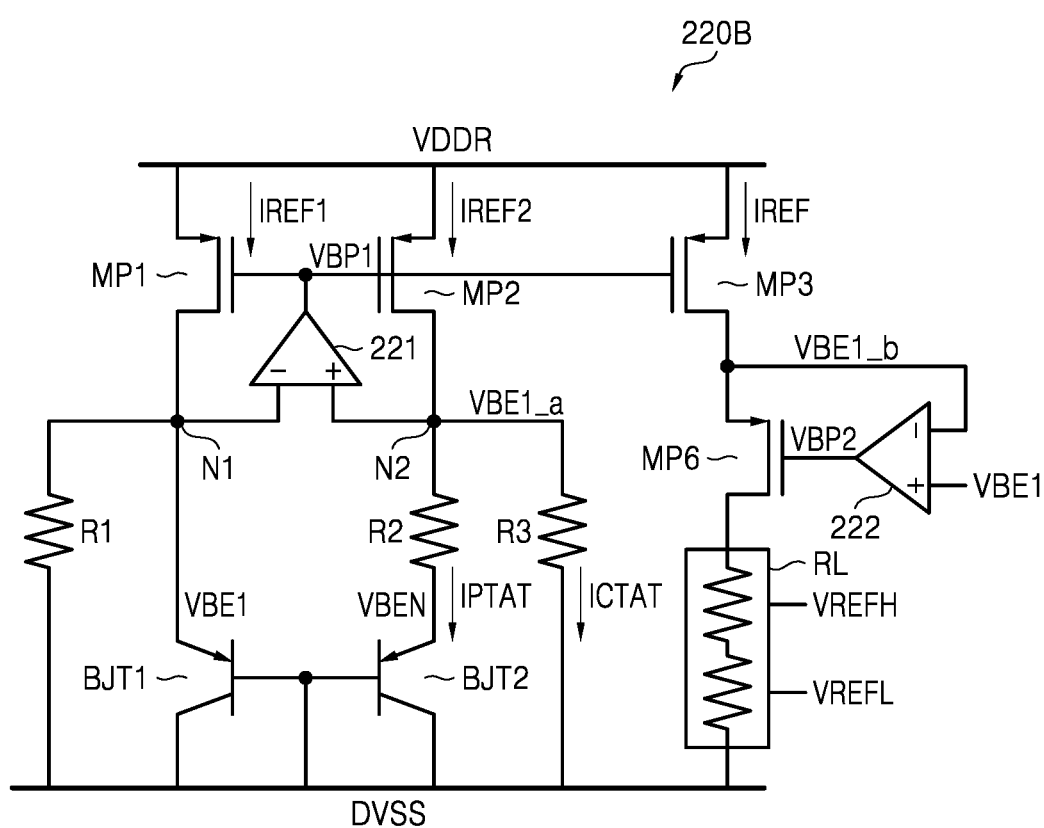
FIG. 11 is a circuit diagram of the reference circuit according to another exemplary embodiment.

FIG. 11 is a circuit diagram of a reference circuit 220B according to another exemplary embodiment. The reference circuit 220 illustrated in FIGS. 3 and 4 may be implemented as the reference circuit 220B but is not limited thereto. The reference circuit 220B illustrated in FIG. 11 is similar to the reference circuit 220A illustrated in FIG. 6. Thus, differences between FIG. 11 and FIG. 3 will be mainly described to avoid redundancy.

The reference circuit 220B illustrated in FIG. 11 further includes a second operational amplifier 222 and a fourth PMOS transistor MP6 as compared to the reference circuit 220A illustrated in FIG. 6.

The fourth PMOS transistor MP6 is interposed between the third PMOS transistor MP3 and the output load RL. The second operational amplifier 222 receives the first node voltage VBE1 and a third node voltage VBE1_b as input signals. An output signal VBP2 of the second operational amplifier 222 is input to a gate of the fourth PMOS transistor MP6. Both input signals VBE1 and VBE1_b of the second operational amplifier 222 are substantially the same as each other, and therefore, the third node voltage VBE1_b is substantially the same as the first node voltage VBE1.

The second node voltage VBE1_a and the third node voltage VBE1_b are substantially the same as the first node voltage VBE1, and therefore, the reference current IREF can be maintained constant like the second reference current IREF2.

Figure 12:
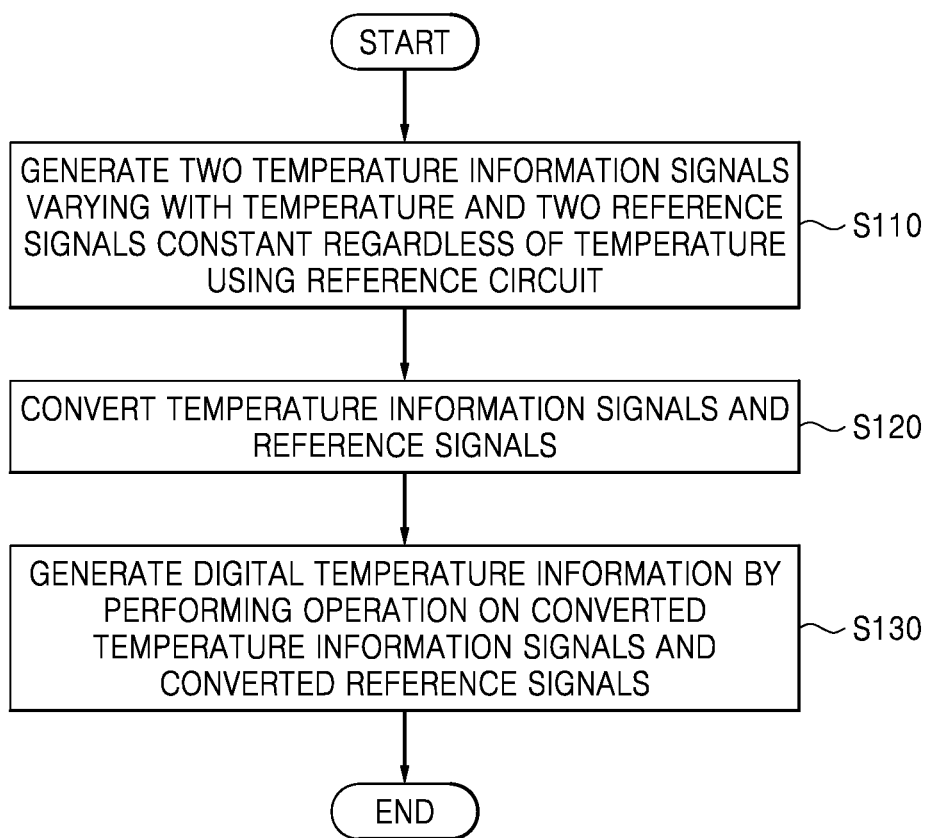
FIG. 12 is a flowchart of a method of operating a temperature sensor according to an exemplary embodiment.

FIG. 12 is a flowchart of a method of operating a temperature sensor according to an exemplary embodiment. The method illustrated in FIG. 12 may be performed by the temperature sensor 10.

Referring to FIG. 12, first and second temperature information signals that vary with temperature and first and second reference signals that are constant regardless of the temperature are generated using a reference circuit in operation S110.

Next, first and second temperature information codes and first and second reference codes are generated by converting the first and second temperature information signals and the first and second reference signals into digital signals, respectively, in operation S120.

A digital temperature signal is generated using the first and second temperature information codes and the first and second reference codes in operation S130. In detail, a first difference signal between the first and second temperature information codes and a second difference signal between the first and second reference codes may be calculated and the digital temperature signal may be calculated by dividing the first difference signal by the second difference signal.

Figure 13:
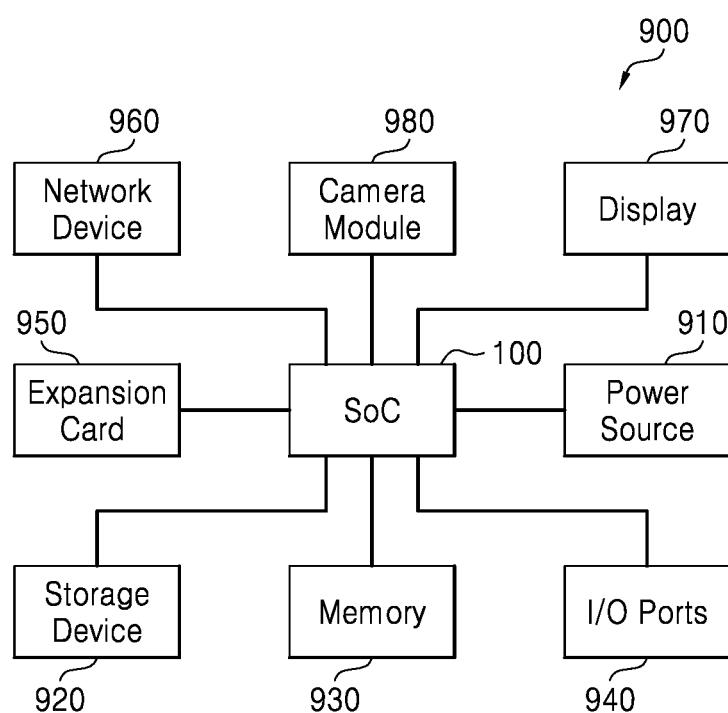
FIG. 13 is a block diagram of an electronic system including a SoC according to an exemplary embodiment.

FIG. 13 is a block diagram of an electronic system 900 including the SoC according to another exemplary embodiment. Referring to FIG. 13, the electronic system 900 may be implemented as a PC, a data server, or a portable device.

The portable device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

The electronic system 900 includes the SoC 100, a power source 910, a storage device 920, a memory 930, input/output (I/O) ports 940, an expansion card 950, a network device 960, and a display 970. The electronic system 900 may further include a camera module 980.

The SoC 100 may correspond to the SoC 100A illustrated in FIG. 1 and/or the SoC 100B illustrated in FIG. 2.

The SoC 100 may control the operation of at least one of the elements 910 through 980. The power source 910 may supply an operating voltage to at least one of the elements 910 through 980. The power source 910 may be controlled by the PMIC 40 illustrated in FIG. 1.

The storage device 920 may be implemented by a hard disk drive (HDD) or a solid state drive (SSD).

The memory 930 may be implemented by a volatile or non-volatile memory. The memory 930 may correspond to the memory 140 illustrated in FIG. 1. A memory controller that controls a data access operation, e.g., a read operation, a write operation (or a program operation), or an erase operation, on the memory 930 may be integrated into or embedded in the SoC 100. Alternatively, the memory controller may be provided between the SoC 100 and the memory 930.

The I/O ports 940 are ports that receive data transmitted to the electronic system 900 or transmit data from the electronic system 900 to an external device. For instance, the I/O ports 940 may include a port connecting with a pointing device such as a computer mouse, a port connecting with a printer, and a port connecting with a USB drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system 900 to be connected with a wired or wireless network. The display 970 displays data output from the storage device 920, the memory 930, the I/O ports 940, the expansion card 950, or the network device 960.

The camera module 980 converts optical images into electrical images. Accordingly, the electrical images output from the camera module 980 may be stored in the storage device 920, the memory 930, or the expansion card 950. Also, the electrical images output from the camera module 980 may be displayed through a display 970.

As described above, according to some exemplary embodiments, a temperature sensor is embedded within a processor and uses power supplied to the processor to sense the inner temperature of the processor, thereby more quickly and accurately sensing the inner temperature of the processor than a temperature sensor placed outside the processor. As a result, thermal runaway is prevented in the processor and a system including the processor, so that the reliability of the processor and the system is increased.

In addition, since a voltage supplied to a circuit of the temperature sensor is maintained constant even when the power level of the processor changes, the temperature sensor operates stably even in low-voltage environments or even when the power level of the processor changes.

Furthermore, errors occurring in processes are compensated for, so that the accuracy of sensing temperature is increased.

While exemplary embodiments been particularly shown and described, it will be understood by those of ordinary skill in the art that various changes in forms and details may be made therein without departing from the spirit and scope of the inventive concept as defined by the following claims.

What is claimed is:

1. A system on chip comprising:
   a processor;
   a memory; and
   a temperature sensor embedded in the processor, the temperature sensor comprising:
      a regulator configured to receive a supply voltage provided from outside the system on chip and utilized for operation of the processor, and generate, using the supply voltage, a regulated voltage having a constant level;
      a reference circuit configured to receive the regulated voltage provided from the regulator, and generate, using the regulated voltage, first and second temperature information signals that vary according to a temperature of the processor, and first and second reference signals that are substantially constant relative to the temperature of the processor; and
      a digital temperature generator configured to receive the first and second temperature information signals and the first and second reference signals generated by the reference circuit, and generate a digital temperature information signal indicative of the temperature of the processor based on the first and second temperature information signals and the first and second reference signals.

2. The system on chip of claim 1, wherein the reference circuit and the digital temperature generator are both embedded in a logic block of the processor, and the supply voltage is utilized by the logic block for operation of the logic block.

3. The system on chip of claim 1, wherein a level of the first reference signal is different from a level of the second reference signal, and the level of one of the first and second temperature information signals varies more with the temperature than the level of the other one of the first and second temperature information signals.

4. The system on chip of claim 1, wherein the digital temperature generator is configured to generate the digital temperature information signal based on a ratio of the first and second temperature information signals to the first and second reference signals.

5. The system on chip of claim 1, wherein the digital temperature generator is configured to convert the first and second temperature information signals into first and second digital temperature codes, respectively, convert the first and second reference signals into first and second digital reference codes, respectively, and generate the digital temperature information signal based on the first and second digital temperature codes and the first and second digital reference codes.

6. The system on chip of claim 5, wherein the digital temperature generator comprises:
   a converter configured to receive the first and second temperature information signals and the first and second reference signals, convert the first and second temperature information signals into the first and second digital temperature codes, respectively, and convert the first and second reference signals into the first and second digital reference codes, respectively; and
   an arithmetic unit configured to receive the first and second digital temperature codes and the first and second digital reference codes output by the converter, and generate the digital temperature information signal based on the first and second digital temperature codes and the first and second digital reference codes.

7. The system on chip of claim 6, wherein the digital temperature generator further comprises a selector configured to receive the first and second temperature information signals and the first and second reference signals, and sequentially output the first and second temperature information signals and the first and second reference signals to the converter.

8. The system on chip of claim 6, wherein the converter comprises:
   a voltage-controlled oscillator configured to receive as an input the first and second temperature information signals and the first and second reference signals, and output an oscillation signal having a frequency which varies with a level of the input;
   a counter circuit configured to count the oscillation signal using a reference clock signal and output a count value; and
   a register that is configured to store the count value output from the counter circuit and generate the first and second digital temperature codes and the first and second digital reference codes based on the stored count value.

9. The system on chip of claim 1, where in the reference circuit comprises a bandgap reference circuit which is configured to generate the first and second reference signals.

10. The system on chip of claim 9, where in the reference circuit comprises:
    first, second and third PMOS transistors each having a source connected to the supply voltage;
    first and second bipolar junction transistors connected to drains of the first and second PMOS transistors, wherein a size of the second bipolar junction transistor is N times larger than a size of the first bipolar junction transistor; and
    an operational amplifier having an output connected to a junction between gates of the first and second PMOS transistors and inputs respectively connected to emitters of the first and second bipolar junction transistors.

11. A mobile system comprising:
    a power management integrated circuit (PMIC);
    a processor;
    a temperature sensor embedded in the processor, the temperature sensor comprising:
       a reference circuit configured to receive a supply voltage provided from the PMIC and utilized for operation of the processor, and generate, using the supply voltage, first and second temperature information signals that vary according to a temperature of the processor, and first and second reference signals that are substantially constant relative to the temperature of the processor; and a digital temperature generator configured to receive the first and second temperature information signals and the first and second reference signals generated by the reference circuit, and generate a digital temperature information signal indicative of the temperature of the processor based on the first and second temperature information signals and the first and second reference signals.

12. The system on chip of claim 11, wherein the reference circuit and the digital temperature generator are both embedded in a logic block of the processor, and the supply voltage is utilized by the logic block for operation of the logic block.

13. The system on chip of claim 11, wherein a level of the first reference signal is different from a level of the second reference signal, and the level of one of the first and second temperature information signals varies more with the temperature than the level of the other one of the first and second temperature information signals.

14. The system on chip of claim 11, wherein the digital temperature generator is configured to generate the digital temperature information signal based on a ratio of the first and second temperature information signals to the first and second reference signals.

15. The system on chip of claim 11, wherein the digital temperature generator is configured to convert the first and second temperature information signals into first and second digital temperature codes, respectively, convert the first and second reference signals into first and second digital reference codes, respectively, and generate the digital temperature information signal based on the first and second digital temperature codes and the first and second digital reference codes.

16. The system on chip of claim 15, wherein the digital temperature generator comprises:

a converter configured to receive the first and second temperature information signals and the first and second reference signals, convert the first and second temperature information signals into the first and second digital temperature codes, respectively, and convert the first and second reference signals into the first and second digital reference codes, respectively; and an arithmetic unit configured to receive the first and second digital temperature codes and the first and second digital reference codes output by the converter, and generate the digital temperature information signal based on the first and second digital temperature codes and the first and second digital reference codes.

17. The system on chip of claim 16, wherein the digital temperature generator further comprises a selector configured to receive the first and second temperature information signals and the first and second reference signals, and sequentially output the first and second temperature information signals and the first and second reference signals to the converter.

18. The system on chip of claim 16, wherein the converter comprises:

a voltage-controlled oscillator configured to receive as an input the first and second temperature information signals and the first and second reference signals, and output an oscillation signal having a frequency which varies with a level of the input;

a counter circuit configured to count the oscillation signal using a reference clock signal and output a count value; and a register that is configured to store the count value output from the counter circuit and generate the first and second digital temperature codes and the first and second digital reference codes based on the stored count value.

19. The system on chip of claim 11, where in the reference circuit comprises a bandgap reference circuit which is configured to generate the first and second reference signals.

20. The system on chip of claim 19, where in the reference circuit comprises:

first, second and third PMOS transistors each having a source connected to the supply voltage;

first and second bipolar junction transistors connected to drains of the first and second PMOS transistors, wherein a size of the second bipolar junction transistor is N times larger than a size of the first bipolar junction transistor; and an operational amplifier having an output connected to a junction between gates of the first and second PMOS transistors and inputs respectively connected to emitters of the first and second bipolar junction transistors.

* * * * *